No. 745,806. PATENTED DEC. 1, 1903.
F. H. ERB, Jr.
DEVICE FOR USE IN TRAINING DOGS.
APPLICATION FILED JUNE 1, 1903.
NO MODEL.

Inventor
F. H. Erb Jr.

Witnesses

By Wilkinson & Fisher
his Attorneys

No. 745,806. Patented December 1, 1903.

UNITED STATES PATENT OFFICE.

FREDRICK H. ERB, JR., OF LAFAYETTE, INDIANA.

DEVICE FOR USE IN TRAINING DOGS.

SPECIFICATION forming part of Letters Patent No. 745,806, dated December 1, 1903.

Application filed June 1, 1903. Serial No. 159,582. (No model.)

*To all whom it may concern:*

Be it known that I, FREDRICK H. ERB, Jr., a citizen of the United States, residing at Lafayette, in the county of Tippecanoe and State of Indiana, have invented certain new and useful Improvements in Devices for Use in Training Dogs; and I do hereby declare the following to be a full, clear, and exact description of the invention, such as will enable others skilled in the art to which it appertains to make and use the same.

My invention relates to improvements in devices for use in training dogs, and is especially applicable for use in connection with the training-collar claimed in my United States application, filed December 12, 1902, Serial No. 134,968, and patented June 23, 1903, under No. 731,876, although it is obvious that it may be used independently of said training-collar.

In properly training a dog to retrieve and at the same time avoiding cruelty and unkindness everything that can be done to assist the dog's intelligence in understanding what you want him to do goes a great way in bringing about the best results, besides facilitating the training. To this end I have designed a simple but satisfactory form of a retrieving member to be used in training, the use of which in the dog's initial lessons I have found from actual experience to be eminently superior to the ordinary method of using sticks or blocks of wood, which lie flat on the ground and cannot therefore be picked up so readily by the young dog.

Figure 1:
Figure 2:
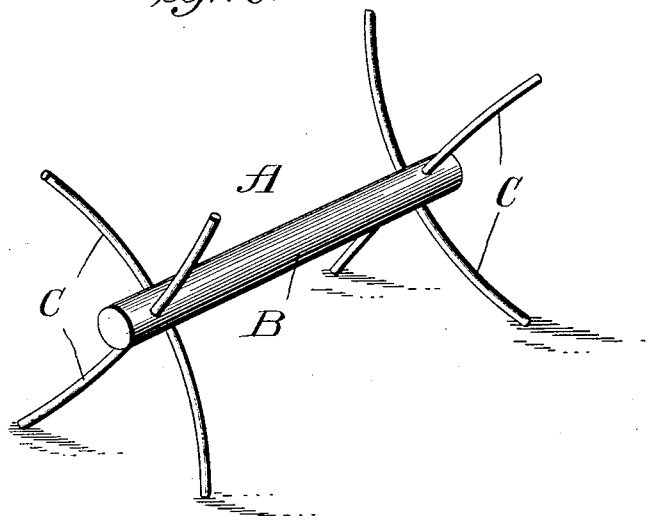

Referring to the accompanying drawings, illustrating my invention, Figure 1 is a view illustrative of the association of a dog with my invention, and Fig. 2 is a perspective view of the retrieving member.

The retrieving member A comprises a cylindrical mouthpiece B, which is supported a sufficient distance above the ground by means of the legs C at each end thereof to enable the dog to put his lower jaw beneath the same and take the retrieving member in his mouth without any apparent effort or annoyance, and the objectionable feature of irritating the dog's nervous or timid temperament, so apparent in young dogs, is in a great measure eliminated.

The legs C may be of any suitable shape and material and are secured to the ends of the mouthpiece B in any suitable way; but in the drawings I have shown holes bored through the ends of the mouthpiece and curved wires passed therethrough a predetermined distance. By this latter arrangement I am enabled to adjust the height of the mouthpiece relatively to the ground, if desirable.

In view of the retrieving member above described the dog seems to more quickly understand what you wish him to do, as the mouthpiece being raised from the ground is more easily grasped.

After the dog has been trained to pick up the retrieving member it is obvious that he can readily be taught to pick up any other small article placed before him and finally, if a hunting dog, to retrieve game in the field.

Modifications might be made without departing from the spirit of my invention; but

What I claim, and desire to secure by Letters Patent of the United States, is—

1. The retrieving device, comprising a mouthpiece and legs supporting said mouthpiece above the ground.

2. The retrieving device, comprising a mouthpiece and legs diverging transversely of the ends of said mouthpiece for supporting said mouthpiece above the ground.

3. The retrieving device, comprising a mouthpiece provided at its ends with radially-diverging legs therearound and adapted to support the mouthpiece above the ground in any position in which the retrieving device might be dropped on the ground.

4. The retrieving device, comprising a mouthpiece and a plurality of legs extending through the ends thereof in substantially radial lines.

5. The retrieving device, comprising a mouthpiece and a plurality of curved legs extending through the ends thereof in substantially radial lines.

In testimony whereof I affix my signature in presence of two witnesses.

FREDRICK H. ERB, JR.

Witnesses:
 FREDERICK O. EVANS,
 ADAM O. BELNER.